(12) United States Patent
Lee et al.

(10) Patent No.: US 12,495,893 B2
(45) Date of Patent: Dec. 16, 2025

(54) METHOD FOR MANUFACTURING BAMBOO TOOTHBRUSH AND BAMBOO TOOTHBRUSH PRODUCED THEREBY

(71) Applicant: PROJECT NOAH, INC., Seoul (KR)

(72) Inventors: Kyungtae Lee, Seoul (KR); Hyunseok Jung, Seoul (KR); Hyunsik Choi, Seoul (KR)

(73) Assignee: PROJECT NOAH, INC., Seoul (KR)

( * ) Notice: Subject to any disclaimer, the term of this patent is extended or adjusted under 35 U.S.C. 154(b) by 363 days.

(21) Appl. No.: 18/024,977

(22) PCT Filed: Apr. 11, 2022

(86) PCT No.: PCT/KR2022/005218
§ 371 (c)(1),
(2) Date: Mar. 7, 2023

(87) PCT Pub. No.: WO2023/182565
PCT Pub. Date: Sep. 28, 2023

(65) Prior Publication Data
US 2024/0277138 A1  Aug. 22, 2024

(30) Foreign Application Priority Data
Mar. 23, 2022 (KR) ........................ 10-2022-0036303

(51) Int. Cl.
*A46D 3/00* (2006.01)
*A46B 9/04* (2006.01)
(Continued)

(52) U.S. Cl.
CPC .................. *A46D 3/00* (2013.01); *A46B 9/04* (2013.01); *A46D 3/02* (2013.01); *A46D 3/04* (2013.01);
(Continued)

(58) Field of Classification Search
CPC .... A46B 9/04; A46B 2200/1066; A46D 3/00; A46D 3/02; A46D 3/04; A46D 9/00; B27J 1/00; B27K 9/002
(Continued)

(56) References Cited

U.S. PATENT DOCUMENTS 5,976,644 A * 11/1999 Sanaee ..................... B27J 1/003
428/17
2006/0053729 A1 3/2006 Wallner
2022/0125192 A1 4/2022 Lee et al.

FOREIGN PATENT DOCUMENTS

CN 106346137 A 1/2017
JP 09-070805 A 3/1997
(Continued)

OTHER PUBLICATIONS

Computer generated English Translation of KR 10-2019665 B1, Lee et al., Nov. 11, 2019. (Year: 2019).*

(Continued)

*Primary Examiner* — Laura C Guidotti
(74) *Attorney, Agent, or Firm* — Revolution IP, PLLC

(57) ABSTRACT

A bamboo toothbrush manufacturing method may include an operation of preparing raw materials, which selecting some of the raw materials as materials suitable for manufacturing bamboo toothbrushes on the basis of a vascular bundle ratio on the cross-section of each of the raw materials; a milling operation of processing the selected materials into the shapes of toothbrush bodies; a pretreatment operation of placing the materials, which have been subjected to the milling process, in an environment having a certain temperature range and a certain humidity range for a certain time range; a hot pressing operation of inserting the materials into a press die, and heating and pressing the materials; an operation of sanding and coating the materials; a drilling operation of forming a plurality of holes in a head portion of (Continued)

each of the materials; and an operation of planting toothbrush bristles into the plurality of holes.

4 Claims, 6 Drawing Sheets

(51) Int. Cl.
    *A46D 3/02*     (2006.01)
    *A46D 3/04*     (2006.01)
    *A46D 9/00*     (2006.01)
    *B27J 1/00*     (2006.01)
    *B27K 9/00*     (2006.01)

(52) U.S. Cl.
    CPC .................................. *A46D 9/00* (2013.01); *B27J 1/00* (2013.01); *B27K 9/002* (2013.01); *A46B 2200/1066* (2013.01)

(58) Field of Classification Search
    USPC .......................................................... 300/21
    See application file for complete search history.

(56) References Cited

FOREIGN PATENT DOCUMENTS

| KR | 10-2005-0016356 A | 2/2005 |
| KR | 10-2010-0054952 A | 5/2010 |
| KR | 10-2019665 B1 | 11/2019 |

OTHER PUBLICATIONS

Computer generated English Translation of CN 106346137 B, Zheng et al., Jun. 22, 2018. (Year: 2018).*
International Search Report of PCT/KR2022/005218 mailed Dec. 9, 2022.

* cited by examiner

METHOD FOR MANUFACTURING BAMBOO TOOTHBRUSH AND BAMBOO TOOTHBRUSH PRODUCED THEREBY

CROSS REFERENCE TO PRIOR APPLICATIONS

This application is the 35 U.S.C. 371 national stage of International application PCT/KR2022/005218 filed on Apr. 11, 2022; which claims priority to Korean Patent Application No. 10-2022-0036303 filed on Mar. 23, 2022. The entire contents of each of the above-identified applications are hereby incorporated by reference.

TECHNICAL FIELD

The present invention relates to a method for manufacturing a bamboo toothbrush and a bamboo toothbrush produced thereby, and to a method for performing various processes on bamboo raw materials, thus manufacturing a high-quality bamboo toothbrush.

BACKGROUND ART

Generally, in a toothbrush body of each of toothbrushes, a head portion and a handle portion are integrally formed. Therefore, a toothbrush whose life is over is discarded in its entirety. The toothbrush body is made of plastic and causes environmental pollution when discarded. Human beings use and discard at least 29.4 billion or 600,000 tons of plastic toothbrushes a year. The discarded plastics only decompose into smaller pieces over time and do not decay forever. Thus, these discarded plastics are not recycled into nature and continue to accumulate somewhere on the earth.

Governmental regulations for each country on the use of plastic products are being strengthened worldwide, and the development of eco-friendly materials that can replace plastics has now become a demand of the times. The bamboo toothbrush markets, which aim to replace plastic toothbrushes, are also growing rapidly. Market Watch predicted that regulations on various plastic products would be strengthened worldwide, supporting plans for eco-friendly products replacing plastic would expand, and bamboo toothbrushes would dominate the global toothbrush markets.

However, bamboos according to the related art absorb moisture well, and thus, fungi easily grow on bamboo toothbrushes. Also, when 'wetting and drying' is repeated while using a bamboo toothbrush, bamboo grains may rise and injure the user's mouth. To manufacture a toothbrush, a bar-shaped bamboo is generally processed into the form of a toothbrush body by manual or semi-automatic work by a worker. In addition, a sanding process and a polishing process are manually performed to make the surface of the toothbrush body flat and smooth. A coating process for forming a coating layer to improve moisture resistance is performed on the surface of the toothbrush body that has undergone the above processes. In addition, a drying process for drying the coating layer is performed thereon. However, a bamboo toothbrush process according to the related art is performed manually or semi-automatically by a worker, and thus, mass production is difficult because the qualities of products are not uniform. In addition, the process time is long because there are many manufacturing processes to be performed.

DISCLOSURE OF THE INVENTION

Technical Problem

The objective of the present invention is to provide a bamboo toothbrush manufacturing method, which has a simplified process and enhances rigidity, surface roughness, and moisture resistance of a bamboo, and a bamboo toothbrush manufactured thereby.

A technical problem to be solved by the embodiment is not limited to the technical problem as described above, and other technical problems may be derived from the following embodiments.

Technical Solution

The objective of the present invention is to provide a bamboo toothbrush manufacturing method, which has a simplified process and enhances rigidity, surface roughness, and moisture resistance of a bamboo, and a bamboo toothbrush manufactured thereby.

Advantageous Effects

The disclosed bamboo toothbrush manufacturing method including material selection, pretreatment, hot pressing process, and the like may reduce manufacturing costs by shortening process time and facilitate mass production. Also, the qualities of the manufactured bamboo toothbrush are excellent.

BEST MODE FOR CARRYING OUT THE INVENTION

A bamboo toothbrush manufacturing method may include an operation of preparing raw materials, which are bar-shaped bamboos, and selecting some of the raw materials as materials suitable for manufacturing bamboo toothbrushes on the basis of a vascular bundle ratio on the cross-section of each of the raw materials; a milling operation of processing the selected materials into the shapes of toothbrush bodies; a pretreatment operation of placing the materials, which have been subjected to the milling process, in an environment having a certain temperature range and a certain humidity range for a certain time range; a hot pressing operation of inserting the materials, which have been pretreated, into a press die, and heating and pressing the materials under a temperature condition of 160° C. to 190° C. and a pressure condition of 0.2 MPa to 4 MPa for a time of 3 minutes to 6 minutes; an operation of sanding and coating the materials which have been subjected to the hot pressing process; a drilling operation of forming a plurality of holes in a head portion of each of the materials; and an operation of planting toothbrush bristles into the plurality of holes.

The operation of selecting may include acquiring cross-sectional images of the raw materials, calculating vascular bundle ratios from binary images obtained by binarizing the cross-sectional images, and classifying the raw materials as unsuitable for manufacturing a bamboo toothbrush when the vascular bundle ratios are greater than or equal to a reference value.

During the pretreatment operation, the certain temperature range may be 60° C. to 90° C., the certain humidity range may be 60% to 90%, and the certain time range may be 4 hours to 6 hours.

The press die may include a lower mold and an upper mold, and the hot pressing operation may include positioning the materials, which have been subjected to the milling process, in the lower mold and pressing the materials only once in one direction by the upper mold.

A bamboo toothbrush, which is manufactured by the bamboo toothbrush manufacturing method, may be disclosed.

MODE FOR CARRYING OUT THE INVENTION

Hereinafter, several embodiments are described clearly and in detail with reference to the accompanying drawings so that those skilled in the art to which the present invention pertains (hereinafter, those skilled in the art) can easily practice the present invention.

Figure 1:
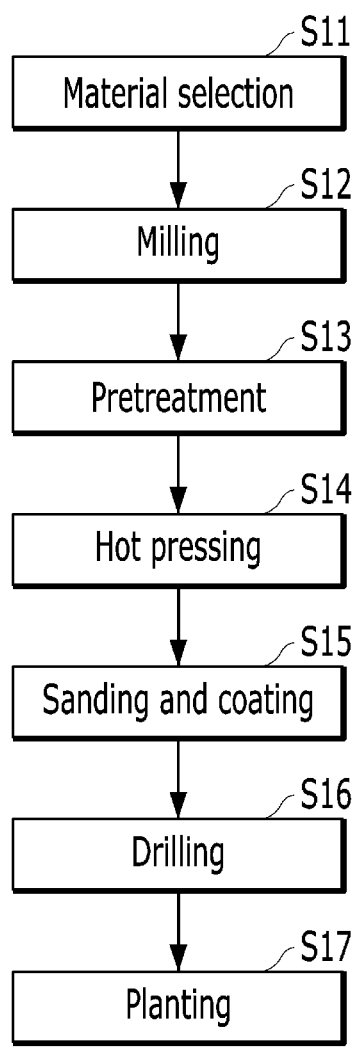
FIG. 1 shows a method for manufacturing a bamboo toothbrush according to an embodiment.

FIG. 1 shows a method for manufacturing a bamboo toothbrush according to an embodiment.

Referring to FIG. 1, a bamboo toothbrush manufacturing method may include a material selecting operation (S11) for raw materials, a milling process operation (S12), a pretreatment process operation (S13), a hot pressing process operation (S14), a sanding and coating process operation (S15), a drilling process operation (S16), and a planting process operation (S17). The bamboo toothbrush manufacturing method may be performed by at least one machine or computing device. When the current process is completed, the completed material is conveyed to a device or a computing device in which a subsequent process is performed. Accordingly, the processes may be sequentially performed.

Figure 2:
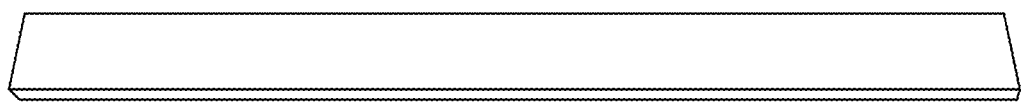
FIG. 2 shows a raw material, which is a bar-shaped bamboo, according to an embodiment.

During the material selecting operation (S10), rectangular bamboo raw materials having a certain size are prepared, and some of the prepared raw materials are selected as suitable materials for manufacturing bamboo toothbrushes. The material selecting operation (S10) may include classifying materials unsuitable for manufacturing bamboo toothbrushes from the raw materials. FIG. 2 is a rectangular bamboo raw material having a certain size according to an embodiment. According to an embodiment, the certain size of the raw material may be 188 mm (width), 15 mm (length), and 5.65 mm (height).

Bamboos have different carbonization conditions and moisture content ratios depending on the time of collection, and the thickness changes depending on a period from collection to preparation for manufacturing bamboo toothbrushes and the humidity of the environment exposed during the period. Therefore, it is necessary to once again determine whether the raw materials are suitable for manufacturing bamboo toothbrushes according to certain criteria.

Among the prepared raw materials, those whose weight or thickness are out of a standard range may be determined to be unsuitable for manufacturing bamboo toothbrushes. In terms of thickness, raw materials that cannot achieve the minimum compressibility (less than 1%) or exceed the maximum compressibility (more than 9%) are determined to be unsuitable for manufacturing bamboo toothbrushes and may be excluded from materials for manufacturing bamboo toothbrushes. Among the prepared raw materials, raw materials having a weight greater than or equal to a reference value are determined to be unsuitable for manufacturing bamboo toothbrushes and may be excluded from the materials for manufacturing bamboo toothbrushes. The reference value may be 14 g, but the embodiment is not limited thereto.

According to an embodiment, the vascular bundle ratio of each of the prepared raw materials may be considered. The vascular bundle is a passage for moving water and nutrients required by a plant, and the vascular bundle ratio may represent a ratio of the area corresponding to the vascular bundle to the area of the cross-section (e.g., 21 and 23 in FIG. 3) of the raw material. When the vascular bundle is dense, drilling is difficult and workability is poor, such as an anchor not being easily inserted during the planting process. Accordingly, materials having a vascular bundle ratio greater than or equal to the reference value are determined to be unsuitable for manufacturing bamboo toothbrushes and may be excluded.

Figure 3A:
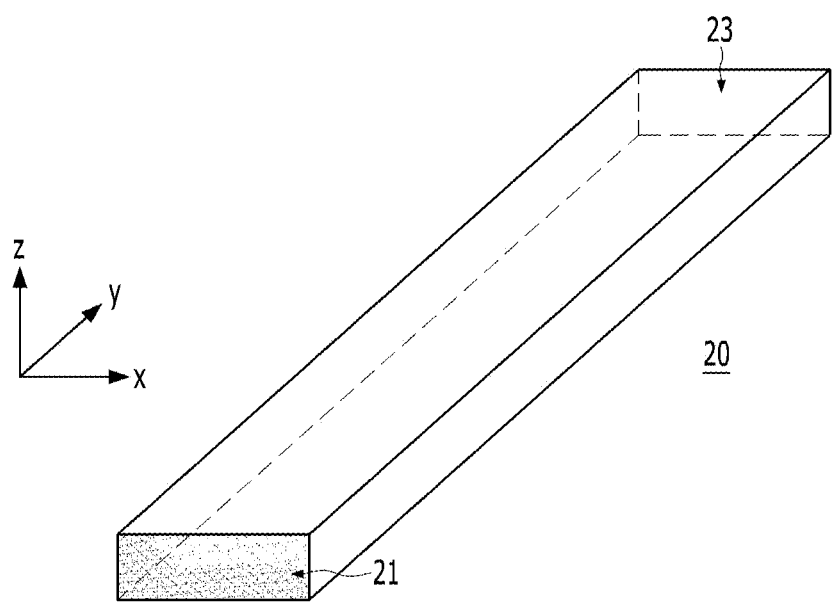
FIG. 3A shows a cross-section of the raw material according to an embodiment.

The material selecting operation (S10) may include classifying a raw material as unsuitable for manufacturing a bamboo toothbrush when the vascular bundle ratio on the cross-section of the raw material is greater than or equal to a reference value. Referring to FIG. 3A, it may be determined whether at least one of the vascular bundle ratios on the cross-sections 21 and 23 of the raw material in a Z-axis direction is greater than or equal to the reference value. According to an embodiment, the vascular bundle ratio on a portion of the cross-section of the raw material may be considered instead of the vascular bundle ratio on the entire cross-section. For example, the vascular bundle ratio of a portion of the cross-section, which corresponds to a certain length on a region having a small vascular bundle ratio among the cross-section of the raw material, may be considered. This is because the drilling process (S16) and the planting process (S17) may be performed on the surface having a small vascular bundle ratio (e.g., the surface having a smaller vascular bundle ratio among an upper surface (a top surface) and a lower surface (a bottom surface or base surface) of FIG. 3A).

Figure 3B:
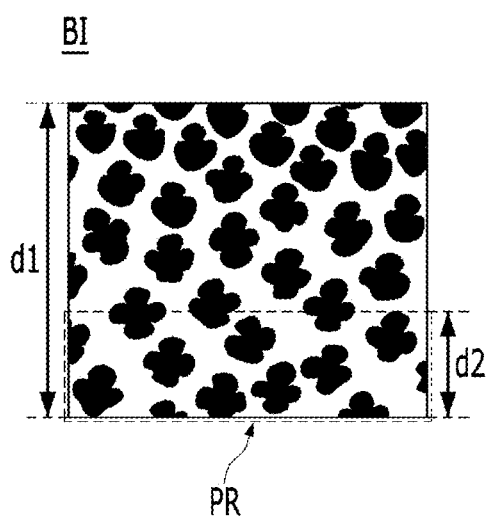
FIG. 3B shows a binary image of the cross-section of the raw material according to an embodiment.

According to an embodiment, a computing device may capture a cross-sectional image of a raw material 20 and convert the captured cross-sectional image into a binary image. The computing device may normalize the cross-sectional image to a size N (where N is the number of pixels). The computing device may generate the binary image by binarizing the normalized cross-sectional image. In the embodiment, a vascular bundle region may be indicated by 1 (black), and the other regions may be indicated by 0 (white). Alternatively, a vascular bundle region may be indicated by 0 (black), and the other regions may be indicated by 1 (white). For the binarization method, various well-known image processing techniques, such as morphological operation, histogram analysis, and edge extraction, may be used. FIG. 3B shows a binary image of the cross-section of the raw material according to an embodiment. A vascular bundle ratio of the entirety of a binary image BA may be compared with a reference value, or a vascular bundle ratio of a portion of the binary image BA having a small vascular bundle ratio PR (indicated by a dotted line) may be compared with the reference value. According to an embodiment, the computing device may classify the current raw material as unsuitable for manufacturing a toothbrush when the vascular bundle ratio is 40% or more, but the reference value of the vascular bundle ratio is not limited thereto.

Referring back to FIG. 1, during the milling process operation (S12), the selected bamboo material (hereinafter, the material) is cut into the shape of the toothbrush body.

The milling process may include CNC machining. The CNC machining represents setting up a workpiece on a table and processing the workpiece to obtain a shape having precision designed by a user. The CNC is an abbreviation of Computer Numerical Control, and refers to an NC (numerical control) device having a built-in computer. That is, in this control method, a command tape (NC program), in which information on the shape of a workpiece and processing conditions is punched, is created, the command tape is read by an information processing circuit to generate a command pulse, and the machining is performed automatically as commanded. Therefore, compared to a manual process according to the related art, qualities of the processed products become stable. In addition, there is an advantage that the manufacturing costs may be reduced because the process time is significantly shortened.

During the milling process, a bar-shaped bamboo material may be processed into the shape of a toothbrush body. The material may form the shape of the toothbrush body in the X- and Y-axis directions, and form the height of the toothbrush body in the Z-axis direction. The height of the toothbrush body may mean the height before being pressed, that is, without undergoing the hot pressing process (S14).

Figure 4:
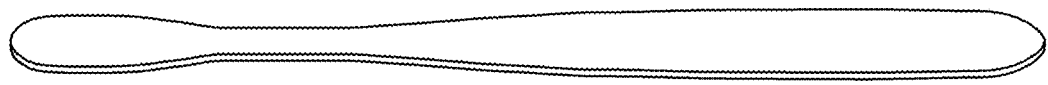
FIG. 4 shows a material which has been subjected to a milling process according to an embodiment.

Poisson's ratio refers to the ratio of transverse strain to vertical strain when a normal stress is applied to a material. The Poisson's ratio is a material strength index that is considered important when understanding deformation in an elastic deformation region. When a normal stress is applied to most materials, the materials are deformed to be compressed in the vertical direction in which the normal stress acts, and are deformed to be expanded in the horizontal direction perpendicular to the normal stress. Therefore, the bar-shaped bamboo material during the milling process may be processed by taking into consideration the expansion in the X- and Y-axis directions due to the pressure applied in the Z-axis direction in the hot pressing process (S14). FIG. 4 shows a state that has undergone the milling process.

The pretreatment process operation (S13) is performed before the hot pressing operation (S14), and represents placing the material, which has undergone the milling process (S12), in an environment having a certain temperature range and a certain humidity range for a certain time range. In order to facilitate the hot pressing process, it is necessary to inject moisture into the material so as to soften the texture thereof. In addition, in order to shorten the time of the hot pressing process, it is necessary to reduce the time required for an initial temperature of the material to be subjected to the hot pressing process (a temperature prior to the hot pressing) to rise to a temperature for performing the hot pressing process. For this, it is necessary to raise the initial temperature. According to an embodiment, the pretreatment process may be performed using a thermo-hygrostat, but the embodiment is not limited thereto.

According to an embodiment, in an environment of the pretreatment, the temperature range may be 60° C. to 90° C., the humidity range may be 60% to 90%, and the time range may be 4 hours to 6 hours. When the temperature condition is less than the above temperature range, the degree of shortening the time of the hot pressing process is reduced. On the other hand, when the temperature condition exceeds the above temperature range, the pretreatment has to be performed using a pressure chamber, which is expensive and not easy. When the humidity condition is less than the above humidity range, the degree of shortening the time of the hot pressing process is reduced. On the other hand, when the humidity condition exceeds the above humidity range, stains may occur as water accumulates and evaporates on the surface of the material after the hot pressing process. When the time condition is less (shorter) than the above time range, there is little pretreatment effect. On the other hand, when the time condition is greater (longer) than the above time range, stains may occur as moisture evaporates from the surface of the material after the hot pressing process.

During the hot pressing process operation (S14), heat and pressure are applied to the material to remove most of moisture and pores contained in a bamboo, and sugar and the like contained in the bamboo may be discharged to increase the density of the bamboo. Therefore, the rigidity of the bamboo is improved to extend the life of a product, and the degree of freedom in future design or processing may be increased. In addition, non-uniform surfaces of the bamboo are compressed to enhance the surface roughness, thereby improving the usability and reducing the occurrence rate of fungi.

In general, bamboos show differences in material properties, depending on varieties, cultivation periods, and cultivation regions. Therefore, since bamboo toothbrushes according to the related art are manufactured manually or semi-automatically, it is impossible to process the bamboo toothbrushes into the same shape due to differences in material properties of bamboos when mass-produced. Therefore, many defects occur, and mass production is difficult. For example, node portions corresponding to relatively hard portions are located differently from each other for bamboos. Accordingly, there is a limitation that a lot of errors occur during processing, and the shapes are different from each other for products. However, in the bamboo toothbrush manufacturing method according to an embodiment, the pretreated bamboo material is inserted into a press die 40 (in FIG. 5) and then heated and pressed during the hot pressing operation (S14) so as to achieve the same shape.

Figure 8:
FIG. 8 shows a material which has even been subjected to drilling and bristle planting according to an embodiment.

Through this processing, a large amount of bamboo toothbrushes having the same shape (FIG. 8) may be manufactured.

Figure 5A:
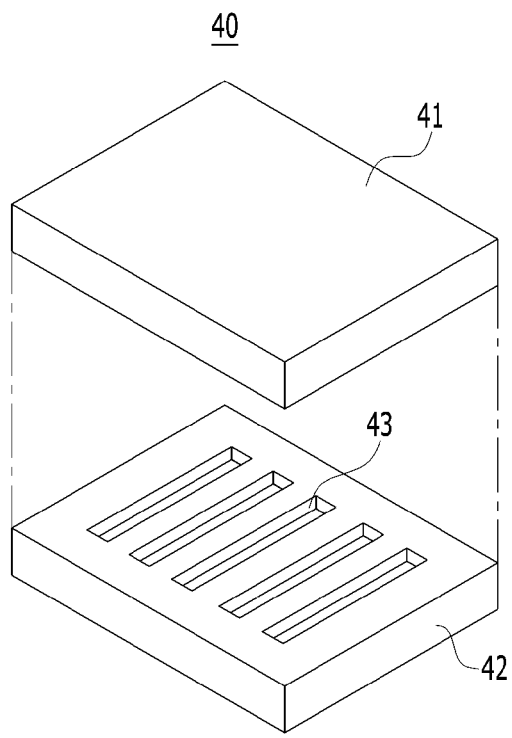
FIG. 5A shows a press die used for a hot pressing process according to an embodiment.

Referring to FIG. 5, the press die 40 may include an upper mold 41 and a lower mold 42. The lower mold 42 has a plate shape and may have a cavity 43 that allows a material to be positioned inside. Here, the cavity 43 is a space in which a toothbrush body (see FIG. 6) is formed, and at least one cavity may be formed. As the number of cavities 43 increases, the number of toothbrush bodies that can be produced by a single process may increase. The size and shape of the cavity 43 is not particularly limited and may be changed according to the shape of the toothbrush body. The upper mold 41 has a plate shape and may press a material so that the material is brought into close contact with the upper surface of the lower mold 42. Accordingly, the processed materials positioned in the cavities 43 may be pressed in the Z-axis direction and simultaneously expanded in the X- and Y-axis directions.

According to an embodiment, the hot pressing process may include placing a material to the inside of the lower mold 42, and pressing the material against the upper mold 41 while applying heat to the same, thereby compressing the material to a desired height. Accordingly, the bamboo may be compressed in the Z-axis direction to have a certain height, and may be expanded by a certain length in the X- and Y-axis directions by the pressure applied thereto in the Z-axis direction. Here, the length expanded in the X- and Y-axis directions may vary depending on the pressure applied in the Z-axis direction. According to an embodiment, the pressing is performed only once in one direction during the hot pressing process. For example, the hot pressing process may be characterized in that the material is placed in the lower mold and pressed only once in one direction (e.g., in the Z-axis direction in FIG. 2 or in a direction going into the paper of FIG. 6) by the upper mold.

Figure 5B:
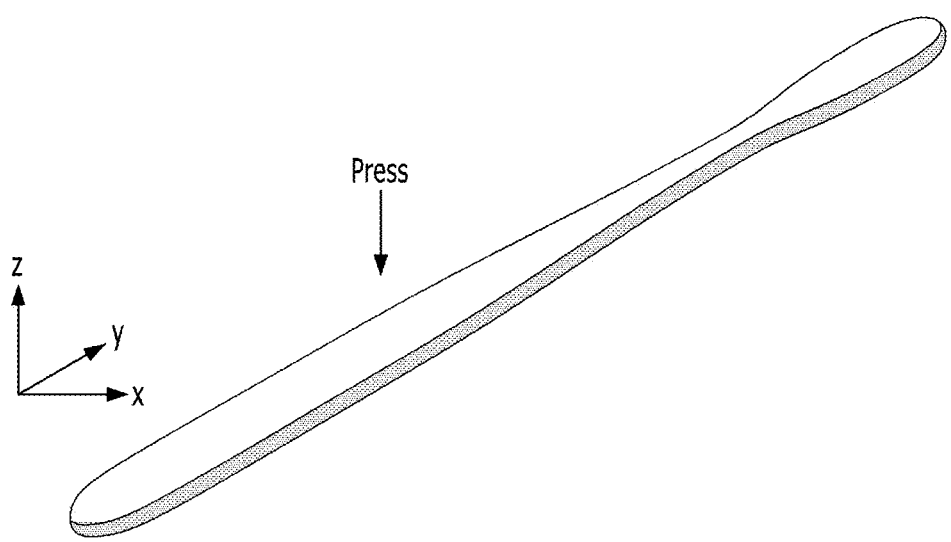
FIG. 5B shows a state in which the material, which has been subjected to the milling process, is pressed according to an embodiment.
Figure 6:
FIG. 6 shows a material which has been subjected to the hot pressing process according to an embodiment.
Figure 7:
FIG. 7 shows a material which has been subjected to sanding and coating according to an embodiment.

Referring to FIG. 5B, the hot pressing process may include pressing the material, which has undergone the milling process, only once in the Z-axis direction. In this embodiment, the upper and lower surfaces of the material may have smooth surfaces by the hot pressing process, but the side surfaces (dotted dark regions) may not have smooth surfaces. However, the present invention is not limited thereto. The hot pressing process may include pressing the material twice or more, such as changing the material in a different direction according to the shape of the toothbrush body, positioning the material in a mold (a lower mold) fitted to the shape, and pressing the material in each direction.

In an embodiment, the hot pressing process may be performed for a time of 3 minutes to 6 minutes by heating the material at a temperature of 160° C. to 190° C. and pressing the material at a pressure of 0.2 MPa to 4 MPa.

When the heating temperature is less than 160° C., the sugar discharged from a bamboo is not sufficiently caramelized, and thus, a coating layer is not uniformly formed. On the other hand, when the heating temperature exceeds 190° C., the bamboo is excessively carbonized, and thus, aesthetically pleasing surface colors may not be achieved. In addition, the toothbrush body may be broken during planting in the planting process operation (S17) described below.

Also, when the pressure is less than 0.2 MPa, moisture contained in the bamboo may not be sufficiently removed. Therefore, considering the material properties of the bamboo itself, it is recommended to pressurize the bamboo at a pressure higher than 0.2 MPa. In order to protect the upper mold 41 and the lower mold 42, it is recommended that the pressure be not exceed 4 MPa.

In addition, when the time of the hot pressing process is less than 3 minutes, the removal of moisture contained in the bamboo and the formation of the coating layer are not sufficiently performed, and the compression is not made well. In addition, even when a material is compressed, the material may be partially recovered due to a spring back phenomenon. When the time of the hot pressing process exceeds 6 minutes, a material may be excessively compressed and become thinner than desired. In addition, the material may be excessively carbonized and broken due to strong brittleness.

Referring back to FIG. 1, during the sanding and coating process operation (S16), the material, which has undergone the hot pressing process, may be sanded and coated to make the surface thereof smooth and improve the surface roughness. According to an embodiment, when the hot pressing has been performed only once in the direction in which the upper and lower surfaces of the toothbrush body are pressed, the sanding may be performed only on the side surface of the toothbrush body. That is, the upper and lower surfaces do not need sanding because these surfaces may have smooth surfaces due to the hot pressing. Therefore, this is to omit the sanding on the upper and lower surfaces, thereby shortening an unnecessary sanding process.

According to an embodiment, the coating process is performed with a tumble spray using an eco-friendly material on the material which has undergone the sanding, and the coating process may be performed using a nozzle diameter of 1 mm for 20 minutes at intervals of spraying for eight seconds and stopping for one second.

During the drilling process operation (S16), a plurality of holes for planting bristles may be formed, by a drill bit, on a head portion of the material that has undergone the sanding and coating process. A process (S17) of planting toothbrush bristles into the plurality of holes formed through the drilling process (S16) may be performed.

The descriptions are intended to provide example configurations and operations for practicing the present invention. The technical ideas of the present invention may include not only the embodiments described above, but also examples that can be obtained by simply changing or modifying the above embodiments. In addition, the technical ideas of the present invention may include examples that may be achieved by easily changing or modifying the above embodiments in the future.

The invention claimed is:

1. A method for manufacturing a bamboo toothbrush, comprising:
    preparing raw materials which are bar-shaped bamboos, and selecting some of the raw materials as suitable for manufacturing bamboo toothbrushes by
        acquiring cross-sectional images of the raw materials,
        calculating vascular bundle ratios from binary images obtained by binarizing the cross-sectional images, and
        classifying the raw materials as unsuitable for manufacturing a bamboo toothbrush upon the raw materials having a vascular bundle ratio greater than or equal to 40%, wherein the vascular bundle ratio is measured for a portion of a cross-section of each raw material corresponding to surface of each raw material that has a lower vascular bundle ratio than an opposite surface of each raw material;
    milling the selected raw materials into the shapes of toothbrush bodies;
    pretreating the milled raw materials by placing the raw materials in an environment at a temperature of 60° C. to 90° C. and a humidity of 60% to 90% for 4 to 6 hours;
    hot pressing the pretreated raw materials by inserting the raw materials into a press die and heating and pressing the materials under a temperature of 160° C. to 190° C. and a pressure of 0.2 MPa to 4 MPa for 3 to 6 minutes;
    sanding and coating the materials that have been subjected to the hot pressing;
    drilling a plurality of holes in a head portion of each of the materials, wherein the plurality of holes are drilled from a face of the head portion that has a lower vascular bundle ratio than an opposite face of the head portion; and
    planting toothbrush bristles into the plurality of holes.

2. The method of claim 1, wherein the press die comprises a lower mold and an upper mold, and during the hot pressing process operation, the materials, which have been subjected to the milling process, are positioned in the lower mold and pressed only once in one direction by the upper mold.

3. A bamboo toothbrush manufactured by the method for manufacturing a bamboo toothbrush of claim 1.

4. The method of claim 1, wherein each raw material has a width of 188 mm, a length of 15 mm, and a height of 5.65 mm, and each raw material is classified as unsuitable for manufacturing the bamboo toothbrush if a weight of each raw material is 14 g or more.

* * * * *